United States Patent [19]

Sano

[11] Patent Number: 5,799,242
[45] Date of Patent: Aug. 25, 1998

[54] COMMUNICATION CONTROL UNIT FOR MOBILE COMMUNICATION SYSTEMS AND THE LIKE, INCLUDING A CHANNEL QUALITY DETECTION UNIT, A QUALITY DECISION UNIT AND A CONTROL UNIT

[75] Inventor: Hiroyasu Sano, Tokyo, Japan

[73] Assignee: Mitsubishi Denki Kabushiki Kaisha, Japan

[21] Appl. No.: 735,245

[22] Filed: Oct. 22, 1996

[30] Foreign Application Priority Data

Mar. 8, 1996 [JP] Japan .......................... 8-051778

[51] Int. Cl.$^6$ .......................... H04B 1/10; H04B 15/00
[52] U.S. Cl. .......................... 455/63; 455/62; 455/67.3; 455/226.1
[58] Field of Search .......................... 455/450, 9, 62, 455/63, 67.1, 67.3, 226.1, 226.2, 226.3, 423, 422, 501, 504, 506; 375/346, 285

[56] References Cited

U.S. PATENT DOCUMENTS

| 4,977,612 | 12/1990 | Wilson . | |
|---|---|---|---|
| 5,297,186 | 3/1994 | Dong | 455/226.3 |
| 5,323,421 | 6/1994 | LaRosa et al. . | |
| 5,471,671 | 11/1995 | Wang et al. | 455/63 |
| 5,506,869 | 4/1996 | Royer | 455/67.3 |

FOREIGN PATENT DOCUMENTS

| 3-89636 | 4/1991 | Japan | 455/63 |
|---|---|---|---|
| 3-222554 | 10/1991 | Japan . | |

*Primary Examiner*—Nguyen Vo
*Attorney, Agent, or Firm*—Rothwell, Figg, Ernst & Kurz, p.c.

[57] ABSTRACT

A communication control unit in accordance with the present invention comprises a channel quality detection unit that includes a differential block for calculating a double differential phase by performing a plurality of times differential on a received signal and a signal lagging behind the received signal by a predetermined time, a frequency calculation block for calculating a frequency by which the double differential phase falls into a pseudo-error area within a predetermined observation time, and a quality index calculation block for calculating an index of the quality of a channel on the basis of an output of the frequency calculation block, and that calculates an index of the quality of a channel employed using a received signal, a quality decision unit for deciding from the result of channel quality index calculation performed on the channel employed which is provided by the channel quality detection unit whether or not a channel is good, a control unit for controlling the channel according to the result of channel quality decision which is provided by the quality decision unit. Consequently, the communication control unit can achieve channel control successfully.

13 Claims, 21 Drawing Sheets

PR : PREAMBLE
DATA : INFORMATION 5,799,242

COMMUNICATION CONTROL UNIT FOR MOBILE COMMUNICATION SYSTEMS AND THE LIKE, INCLUDING A CHANNEL QUALITY DETECTION UNIT, A QUALITY DECISION UNIT AND A CONTROL UNIT

BACKGROUND OF THE INVENTION

1. Field of the Invention:

The present invention relates to a communication control unit to be mounted on a mobile terminal or the like adapted for the field of radio communication such as a mobile communication system.

2. Description of the Related Art:

The configuration of a conventional communication control unit will be described with reference to FIG. 20. FIG. 20 is a block diagram showing the configuration of a channel quality detection unit in a conventional communication control unit disclosed in, for example, Japanese Patent Laid-Open No. 3-222554.

In FIG. 20, a channel quality detection unit 1 comprises a detection block 2 for detecting a received signal A for the purpose of extracting demodulation data from a digital modulated signal in a receiving unit, a pseudo-error detection block 3 that when the phase angle of a detected signal B falls into a specified pseudo-error area, outputs a pseudo-error pulse C, a pseudo-error rate calculation block 4 for outputting a probability of occurrence of the pseudo-error pulse C as a pseudo-error rate D, and a bit error rate estimation block 5 for calculating and outputting a value of a estimated bit error rate E using the value of the pseudo-error rate D according to the inherent functional relation which is established with a ratio of carrier-to-noise (C/N) as a parameter between the pseudo-error rate D and bit error rate. The detected signal B is a sample obtained at intervals of a symbol time.

Next, the operation of the foregoing channel quality detection unit 1 for a conventional communication control unit will be described with reference to FIG. 21. FIG. 21 is a diagram showing a pseudo-error area for explaining the principles of pseudo-error detection in the conventional channel quality detection unit.

Now, a mention will be made of a case in which quadrature phase shift keying (QPSK) is used as an example of phase modulation providing a digital modulated signal. A detected signal B that is a sample obtained at intervals of a symbol time is input to the pseudo-error detection block 3. The pseudo-error detection block 3 outputs a pseudo-error pulse C when the phase angle θ of the detected signal B falls into, for example, an area depicted as a hatched area in FIG. 21, that is, an area defined by the following expression (1):

$$|(\theta+\pi/4) \bmod \pi/2 - \pi/4| \geq \pi/80 \leq \theta < 2\pi \tag{1}$$

The pseudo-error calculation block 4 outputs a probability of occurrence of the pseudo-error pulse C within an observation time as a pseudo-error rate D. The bit error rate estimation block 5 estimates a bit error rate corresponding to the pseudo-error rate D and outputs a estimated bit error rate E as an index of the quality of a channel.

Speaking of the foregoing channel quality detection unit for a conventional communication control unit, in the case of mobile communication, radio waves are reflected, diffracted, or scattered by ambient buildings or geography. Waves (multipath waves) having passed through a plurality of propagation paths arrive at a mobile station. Since the waves interfere with one another, "Rayleigh fading" in which the envelope and phase of a received wave vary at random occurs. Moreover, in a relatively clear place between a base station and mobile station, not only multipath waves but also direct waves coming from other base stations arrive. Propagation paths may therefore become "Rice fading"-prone propagation paths. Above all, in the case of mobile satellite communication, a space between a satellite and mobile station is relatively clear. Propagation paths therefore become Rice fading propagation paths. However, as far as the Rice fading propagation paths are concerned, the natures of the propagation paths are mutually different in terms of the ratio of a direct wave to a multipath wave and the fading bandwidth dependent greatly on a movement velocity of the mobile station. The state of a channel therefore varies greatly. In a place in which a C/N (carrier-to-noise ratio) is large, the influence of an envelope variation and a phase shift in a received wave due to fading becomes more dominant than noises. This poses a problem in that it becomes hard to detect the C/N or the like serving as an index of the quality of channel.

In mobile communication, propagation paths are quite susceptible to ambient buildings or geography. Such a situation that a radio wave is cut off by a tunnel, a tree, or the like arises often. This poses a problem in that when a radio wave is cut off, it becomes hard to accurately detect the quality of a channel between a base station and mobile station with the quality kept unaffected by the cutoff.

Furthermore, the results of a channel quality detection may differ from another because of the properties of a receiver. This poses a problem in that the difference may make it impossible to successfully achieve channel control such as the switching of a channel to another or the disconnection of a channel according to the result of channel quality detection.

SUMMARY OF THE INVENTION

The present invention attempts to solve the aforesaid problems. An object of the present invention is to provide a communication control unit capable of detecting the quality of a channel accurately even in case the natures of propagation paths that are prone to fading typical of Rayleigh fading and Rice fading are mutually different in terms of the ratio of a direct wave to a multipath wave and the fading bandwidth dependent greatly on the movement velocity of a mobile station.

Another object of the present invention is to provide a communication control unit capable of accurately detecting the quality of a channel although such a situation that a radio wave is cut off by a tunnel, tree, or the like may arise within an observation time during which the quality of the channel is being observed because propagation paths are quite susceptible to ambient buildings or geography in the case of mobile communication.

Still another object of the present invention is to provide a communication control unit capable of successfully achieving channel control such as switching of a channel to another, disconnection of a channel, or the like, which is carried out according to the detected result of channel quality detection, even in the case of mobile communication.

A communication control unit in accordance with the present invention comprises a channel quality detection means for calculating an index of the quality of a channel employed using a received signal, a quality decision means for deciding from the result of channel quality index calculation performed on a channel employed which is provided by the channel quality detection means whether or not a channel is good, and a control means for controlling a channel according to the result of channel quality decision which is provided by the quality decision means. The communication control unit can therefore achieve channel control successfully.

In the communication control unit in accordance with the present invention, since the channel quality detection means includes a differential means for calculating a multi differential phase by performing a plurality of times differential on a first received signal and a second received signal lagging behind the first received signal by a predetermined time, a frequency calculation means for calculating a frequency by which the multi differential phase falls into a pseudo-error area within a predetermined observation time, and a quality index calculation means for calculating an index of the quality of a channel on the basis of an output of the frequency calculation means, an envelope variation or phase shift in a received wave caused by fading becomes less influential, and the accuracy of channel quality detection can be improved. Moreover, since subtraction is carried out a plurality of times, the signal-to-noise ratio of a received signal to be input to the channel quality detection means is lowered equivalently. Besides, the frequency by which the multi differential phase is observed to fall into the pseudo-error area within the observation time increases. Consequently, even when a received signal has a large C/N, that is, a channel is of good quality, the quality of the channel can be detected accurately.

Moreover, since the communication control unit in accordance with the present invention includes the differential means that carries out differential twice or more times, a unit unsusceptible to a frequency offset of a received signal or a phase shift thereof caused by fading can be realized.

Moreover, in the communication control unit in accordance with the present invention, since the frequency calculation means includes a pseudo-error detection means for deciding whether or not a multi differential phase output from the differential means falls into the pseudo-error area and for outputting the result of decision, and a count means for counting the number of pseudo errors detected within a predetermined observation time according to the result of pseudo-error detection which is output from the pseudo-error detection means, frequency calculation can be realized through simple processing including addition and subtraction alone.

Moreover, since the communication control unit in accordance with the present invention includes the pseudo-error detection means for varying the size of the pseudo-error area according to the quality of a channel, a wide range of qualities of channels, that is, a range from a small C/N of a received signal to a large C/N thereof can be covered for channel quality detection.

Moreover, since the communication control unit in accordance with the present invention includes the quality index calculation means for calculating a pseudo-error rate observed within an observation time as an index of the quality of a channel on the basis of an output of the frequency calculation means, the quality of a channel within the observation time can be expressed quantitatively.

Moreover, since the communication control unit in accordance with the present invention includes the quality index calculation means for converting the pseudo-error rate into a C/N and calculating the C/N as an index of the quality of a channel, the ratio of a signal power on the channel to a noise power thereon can be detected.

Moreover, in the communication control unit in accordance with the present invention, since the channel quality detection means further includes a frame selection means for detecting the quality of a channel using only the frames to which a known pattern sent from a transmission side is appended and in which the known pattern is detected, even if a radio wave is cut off, the quality of a channel unaffected by the cutoff can be detected accurately.

Moreover, in the communication control unit in accordance with the present invention, since the channel quality detection means further includes a frame selection means that when a known pattern is detected in a frame to which the known pattern sent from a transmission side has been appended, uses a calculated frequency within the frame, that when the known pattern is not detected, substitutes a calculated frequency within a frame in which the known pattern has been detected previously, and that thus calculates a frequency within a predetermined observation time, even if a radio wave is cut off, the quality of a channel unaffected by the cutoff can be detected accurately. Besides, the quality of a channel can be detected without any increase in time required for channel quality detection.

Moreover, since the communication control unit in accordance with the present invention includes the quality decision means that when the result of channel quality index calculation performed on a channel employed which is provided by the channel quality detection means falls below a predetermined threshold indicating a lower limit of the quality of a channel, decides that communication is unfeasible, whether or not the quality of a channel is good can be decided despite the simple circuitry.

Moreover, since the communication control unit in accordance with the present invention includes the quality decision means that has a margin predetermined relative to the threshold, that when the result of channel quality index calculation performed on a channel employed which is provided by the channel quality detection means is within the margin, decides that communication is feasible, and that when the result of channel quality index calculation falls below the margin and indicates the deteriorated quality of a channel, decides that communication is unfeasible, the influence of a difference in properties of a receiver from another receiver upon channel control can be minimized.

Moreover, since the communication control unit in accordance with the present invention includes the control means that when it is decided from the result of channel quality decision which is provided by the quality decision means that communication is unfeasible, switches a channel to another, the qualities of channels can be maintained.

Moreover, since the communication control unit in accordance with the present invention includes the control means that when it is decided from the result of channel quality decision which is provided by the quality decision means that communication is unfeasible, disconnects a channel, channels can be utilized effectively.

Furthermore, since the communication control unit in accordance with the present invention includes the quality decision means that when it is decided that communication is unfeasible, decides from the results of channel quality index calculation which are provided by the channel quality detection means which channel is the best of all usable channels, and the control means for switching an ongoing channel to a channel decided as the best channel, the qualities of the channels can be kept good.

DESCRIPTION OF THE PREFERRED EMBODIMENTS

First Embodiment

Figure 1:
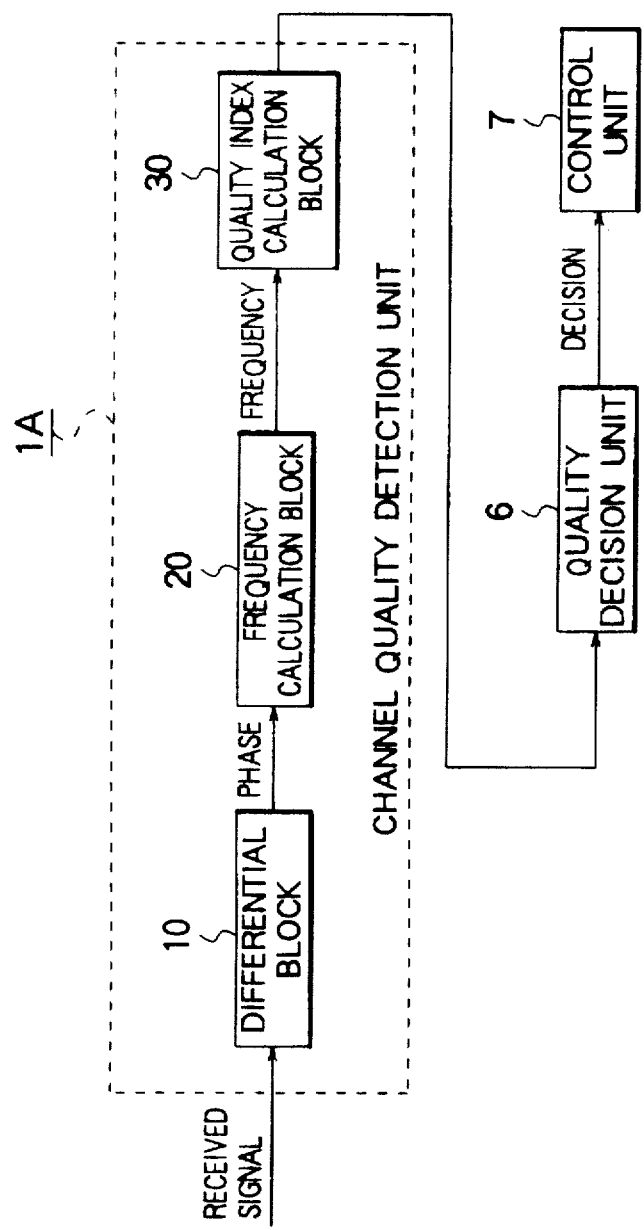
FIG. 1 is a block diagram showing the configuration of a communication control unit in accordance with the first embodiment of the present invention.
Figure 2:
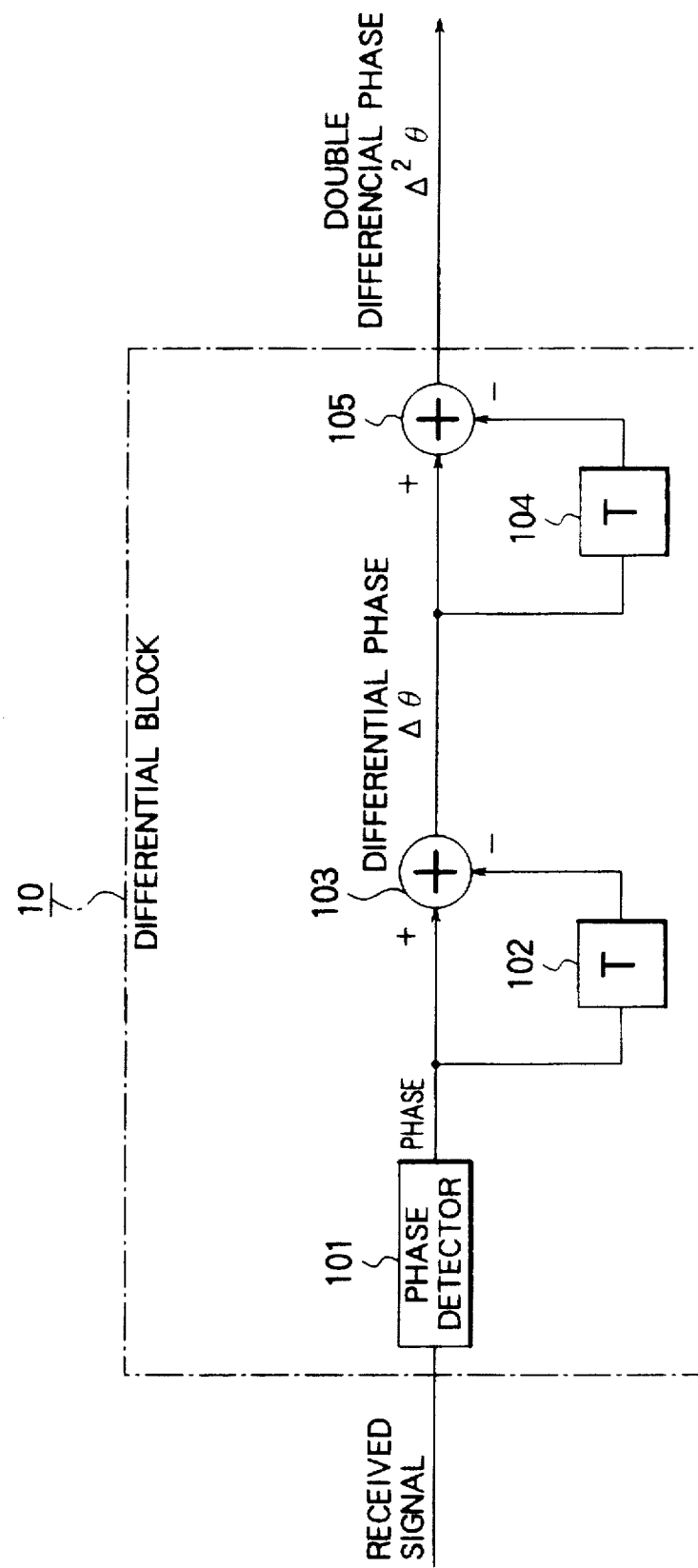
FIG. 2 shows the configuration of a differential block in the first embodiment of the present invention.
Figure 3:
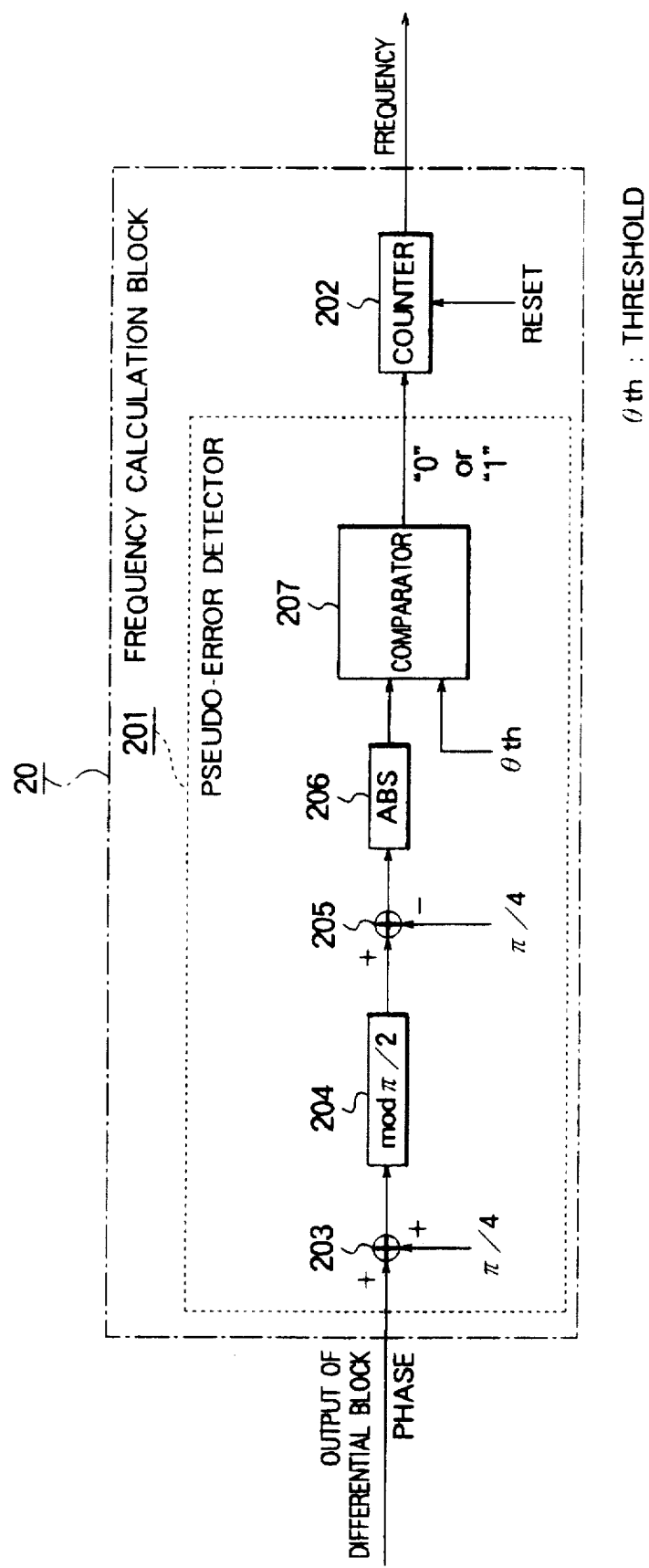
FIG. 3 shows the configuration of a frequency calculation block in the first embodiment of the present invention.

The configuration of a communication control unit in accordance with the first embodiment of the present invention will be described with reference to FIGS. 1, 2, and 3. FIG. 1 is a block diagram showing the configuration of the communication control unit in accordance with the first embodiment. FIG. 2 is a diagram showing the configuration of a differential block in the first embodiment. FIG. 3 is a diagram showing the configuration of a frequency calculation block in the first embodiment of the present invention. In the drawings, the same reference numerals denote the same or equivalent parts.

Referring to FIG. 1, the communication control unit in accordance with the first embodiment of the present invention comprises a channel quality detection unit 1A, a quality decision unit 6, and a control unit 7.

In the drawing, the channel quality detection unit 1A comprises a differential block 10, a frequency calculation block 20, and a quality index calculation block 30.

The differential block 10 is a circuit for obtaining a double differential value of a phase of a received signal. The frequency calculation block 20 is a circuit for calculating a frequency by which the double differential phase detected by the differential block 10 falls into a pseudo-error area, which will be described later, within a predetermined observation time. The quality index calculation block 30 is a circuit for calculating a pseudo-error rate within the observation time, which serves as an index of the quality of a channel, on the basis of the frequency calculated by the frequency calculation block 20, and calculating a corresponding C/N that serves as an index of the quality of the channel.

The quality decision unit 6 decides from the index of quality calculated by the quality index calculation block 30 whether or not the quality of a predetermined channel is good. The control unit 7 switches one channel to another according to the result of channel quality decision.

In FIG. 2, the differential block 10 comprises a phase detector 101, a delay device 102 for delaying a signal by a time corresponding to one symbol, a subtractor 103, a delay device 104, and a subtractor 105.

Referring to FIG. 3, the frequency calculation block 20 comprises a pseudo-error detector 201 for deciding whether or not a double differential phase of a received signal which is detected by the differential block 10 falls into a pseudo-error area, and for outputting the result of decision, and a counter 202 for counting the number of pseudo errors detected within an observation time according to the results of pseudo-error detection detected by the pseudo-error detector 201.

In the drawing, the pseudo-error detector 201 includes an adder 203 for adding a phase angle of $\pi/4$, a modulo-$\pi/2$ circuit 204 for performing module-$\pi/2$ on an adder output, a subtractor 205 for subtracting a phase angle of $\pi/4$, an ABS circuit 206 for calculating an output of an absolute value from a result provided by the subtractor 205, and a comparator 207 for comparing an output of the ABS circuit 206 with a threshold $\theta$ th, for outputting a "1" in case the output is larger than or equal to the threshold $\theta$ th, and for outputting a "0" in case the output is smaller than the threshold $\theta$ th.

The communication control unit in accordance with the present invention is adapted for a system using a phase-modulated signal or a signal resulting from phase modulation represented by binary phase shift keying (BPSK), quadrature phase shift keying (QPSK), or the like, and attempts to detect the quality of a channel to be employed and thus control channels on the basis of obtained indices of the qualities of channels. The communication control unit in accordance with the first embodiment will be described by taking the case of using a QPSK signal for instance.

7

Figure 4:
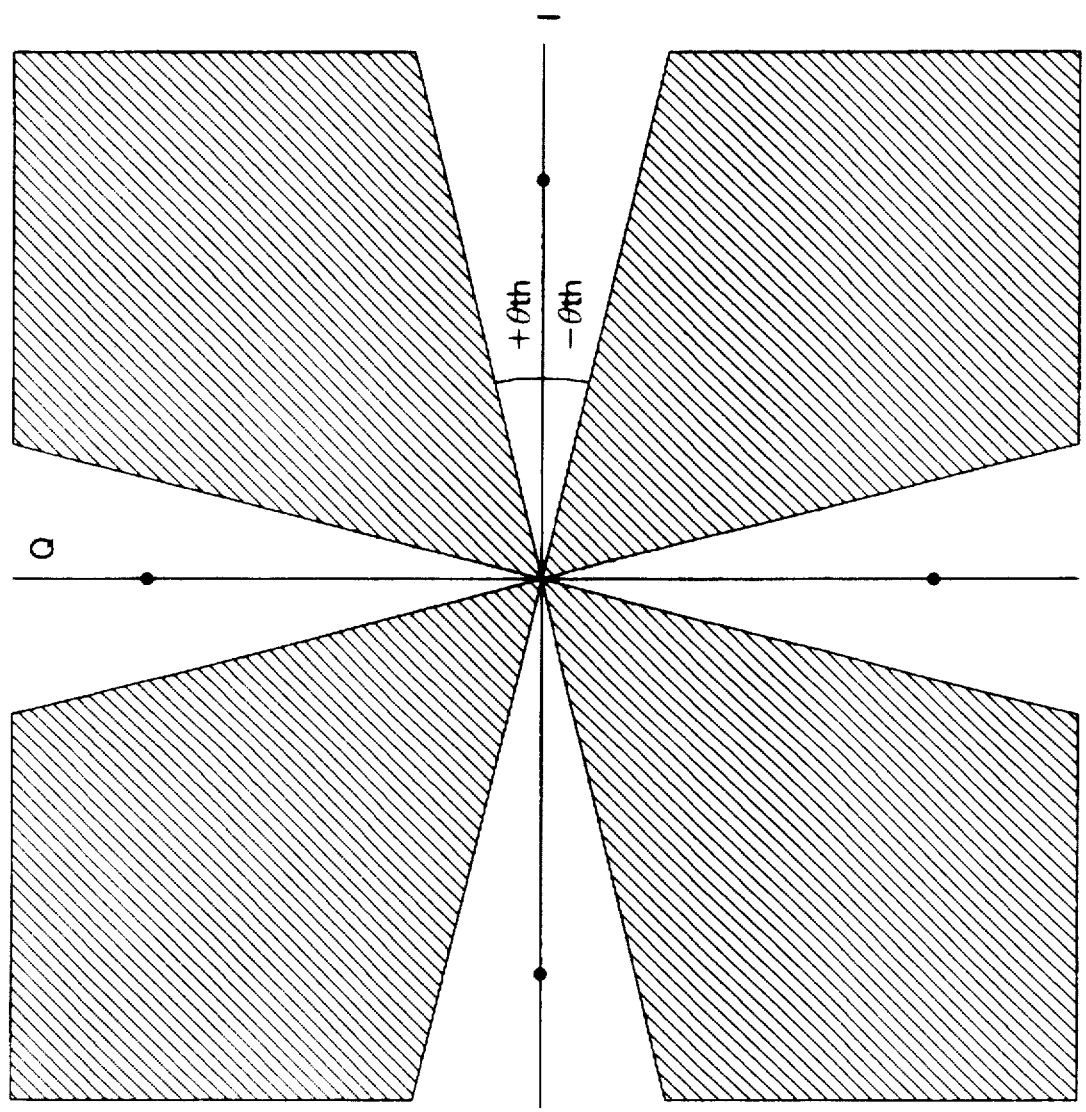
FIG. 4 shows a pseudo-error area for explaining the principles of detecting a pseudo error using a phase output from the differential block in the first embodiment of the present invention.
Figure 5:
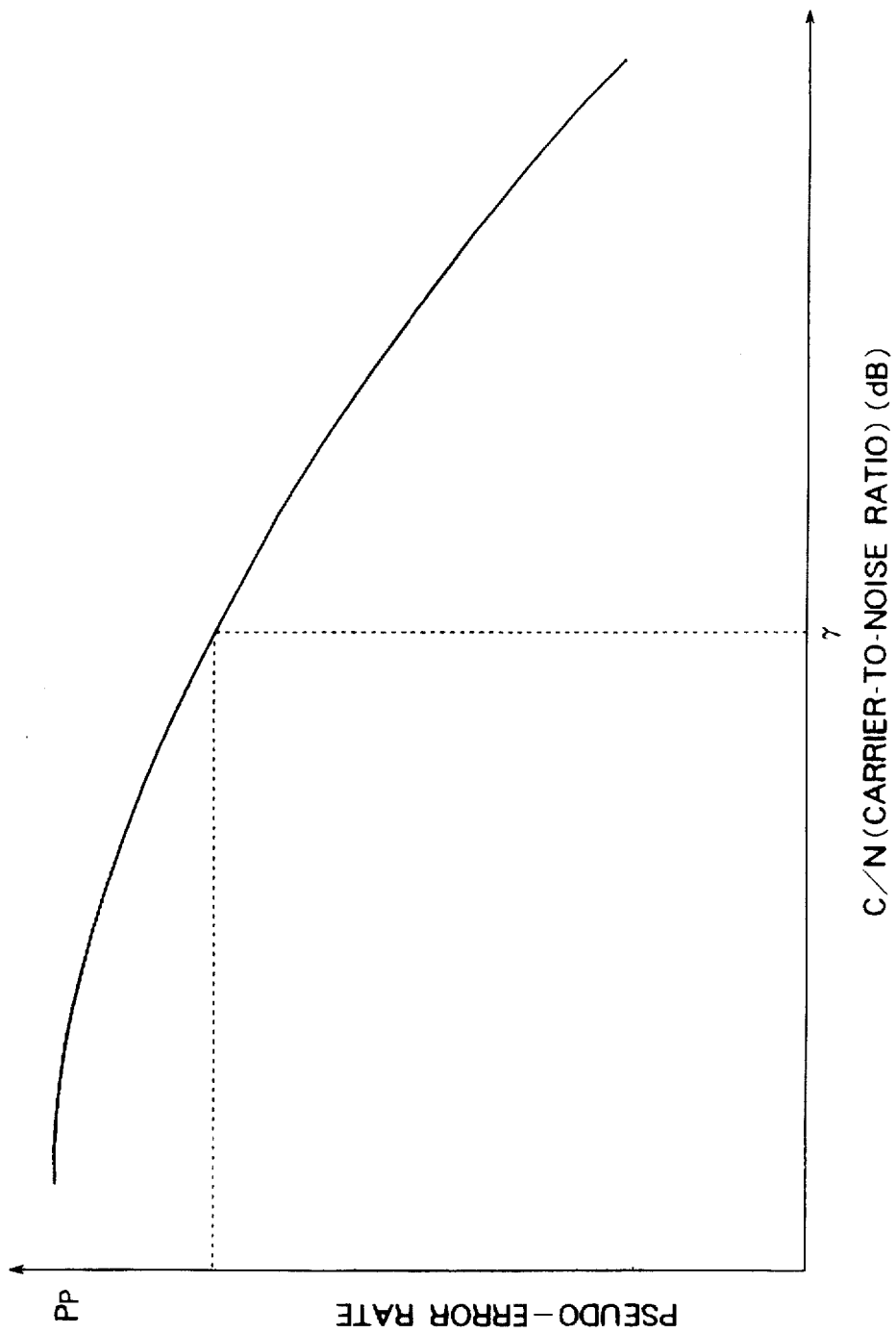
FIG. 5 shows the relationship of correspondence between the pseudo-error rate and the C/N of a received signal in a quality index calculation block in the first embodiment of the present invention.

Next, the operation of the first embodiment will be described with reference to FIGS. 4 and 5. FIG. 4 is a diagram showing a pseudo-error area for explaining the principles of detecting a pseudo error using a phase output from the differential block in the first embodiment. FIG. 5 is a diagram showing the relationship of correspondence between the pseudo-error rate and the C/N of a received signal in the quality index calculation block in the first embodiment.

The differential block 10 extracts phase information from a received signal input by the phase detector 101, performs subtraction twice on the obtained phase of the received signal at intervals of a symbol time T, and outputs the result of subtraction to the frequency calculation block 20. The frequency calculation block 20 calculates a frequency by which the double differential phase $\Delta^2\theta$ of the received signal exceeds a threshold $\theta$ th within an observation time as a result of calculation, that is, a frequency by which the double differential phase falls into a pseudo-error area (hatched area in FIG. 4) according to the expression below (2).

$$|(\Delta^2\theta+\pi/4)\text{mod}\pi/2-\pi/4|\geq\theta\text{ th} \quad 0<\theta\text{th}<\pi/4 \qquad (2)$$

The operation of the frequency calculation block 20 will be described in conjunction with FIG. 3. A double differential phase detected by the differential block 10 is input to the pseudo-error detector 201, and then subjected to the processing expressed as the left side of the above expression (2). Specifically, the adder 203 adds a phase angle of $\pi/4$, and the modulo-$\pi/2$ circuit 204 performs modulo-$\pi/2$ on the adder output. Thereafter, the subtractor 205 subtracts a phase angle of $\pi/4$, and the ABS circuit 206 calculates an output of an absolute value from a result provided by the subtractor 205. An output of the ABS circuit 206 is compared with the threshold $\theta$ th. If the result of computation of the left side is larger than or equal to the threshold $\theta$ th, the comparator 207 outputs a "1." On the contrary, if the result is smaller than the threshold, the comparator outputs a "0." An output of the comparator 207 is input to the counter 202. The counter 202 counts a frequency n by which the double differential phase falls into the pseudo-error area within the observation time.

The frequency n provided by the frequency calculation block 20 is input to the quality index calculation block 30. The quality index calculation block 30 calculates a pseudo-error rate $P_p$ according to the expression below (3). The pseudo-error rate $P_p$ is given by the following expression (3) where a total number of samples to be observed within the observation time is N:

$$P_p=n/N \qquad (3)$$

The pseudo-error rate $P_p$ and the C/N of a received signal have the relationship of correspondence shown in FIG. 5. Based on the obtained pseudo-error rate $P_p$, therefore, a corresponding C/N serving as an index of the quality of a channel is calculated by the quality index calculation block 30. The obtained C/N serving as an index of the quality of a channel is input to the quality decision unit 6. If the C/N exceeds a decision threshold, the quality decision unit 6 decides that the quality of a channel concerned is good. If the C/N falls below the decision threshold, the quality decision unit 6 judges that the quality of the channel is not good (poor).

Based on an output of a decision output from the quality decision unit 6, if a channel is good, the control unit 7 keeps using the channel as it is. If a channel is not good, the control unit 7 gives control so as to switch the channel to another channel.

8

Figure 6:
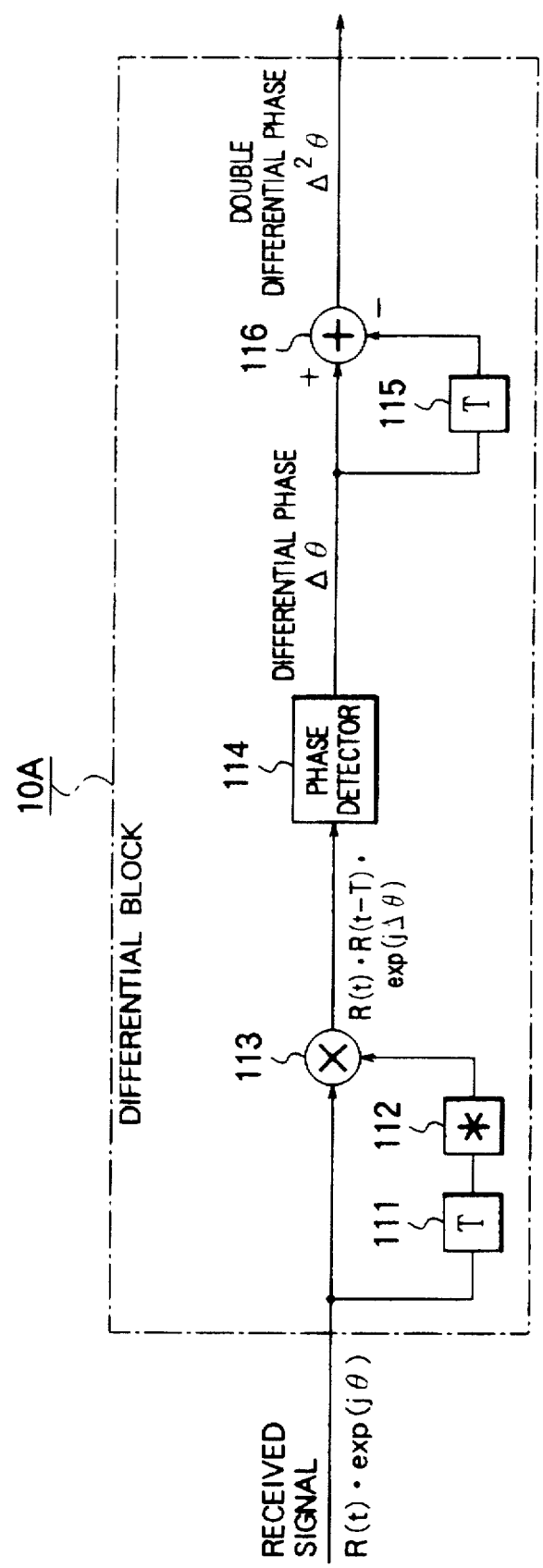
FIG. 6 shows another configuration of the differential block in the first embodiment of the present invention.

In the aforesaid first embodiment, the differential block 10 for detecting the phase of a received signal and calculating a double differential phase by performing subtraction twice on the phase is used as a differential means. Alternatively, a differential block 10A shown in FIG. 6 may be employed.

To be more specific, the differential block 10A performs subtraction once on the phase of a received signal by allowing a complex multiplier 113 to calculate the complex multiplication of an ongoing received signal and a complex conjugate signal of a received signal received by one symbol time previously, which is produced by a delay device 111 and complex conjugator 112. After a differential phase is detected using the result of differential by means of a phase detector 114, the detected phase is subtracted from a differential phase obtained by one symbol time previously. Thus, a double differential phase is detected.

Figure 7:
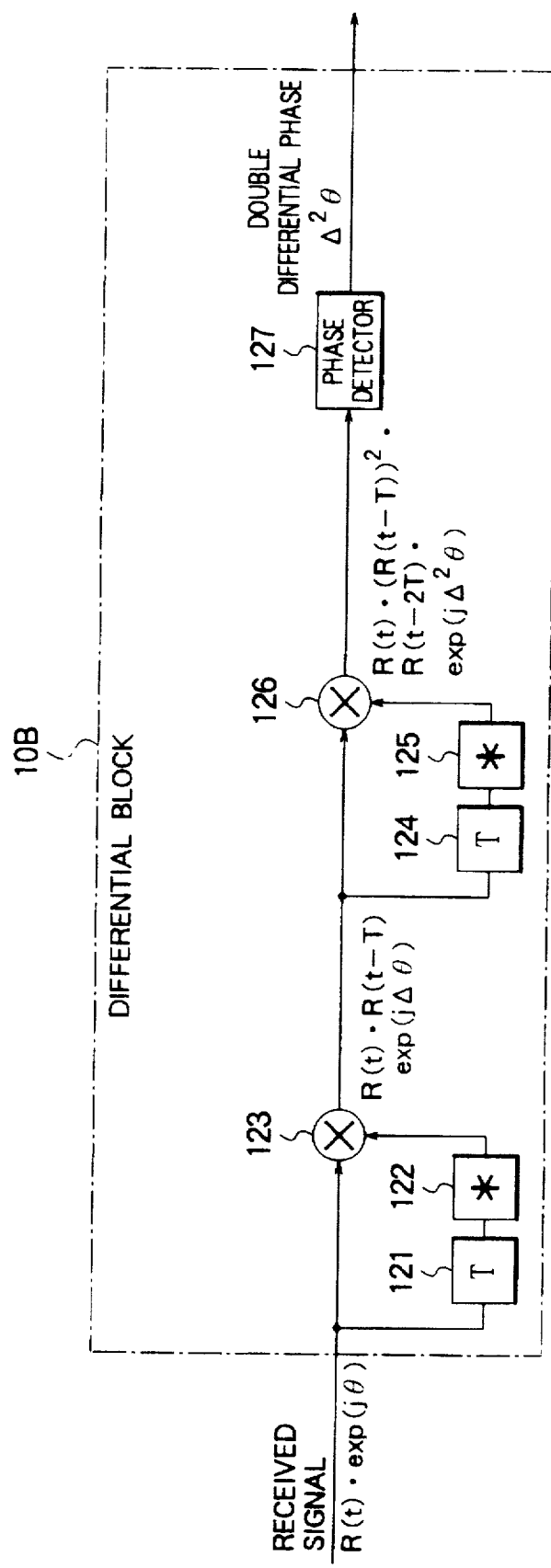
FIG. 7 shows another configuration of the differential block in the first embodiment of the present invention.

Moreover, a differential block 10B shown in FIG. 7 may be employed. Specifically, the differential block 10B allows a complex multiplier to calculate the complex multiplication of an ongoing received signal and a complex conjugate signal of a received signal received by one symbol time previously, which is produced by a delay device 121,and complex conjugator 122. A complex conjugate signal lagging by one symbol time is produced using a resultant signal of complex multiplication by a delay device 124 and complex conjugator 125. The phase of a signal stemming from complex multiplication performed by a complex multiplier 126 is detected by a phase detector 127. Thus, a double differential phase is detected.

In the aforesaid first embodiment, when a difference value is calculated in the differential block 10 shown in FIG. 2, the delay devices 102 and 104 delay an input signal by a time equivalent to a symbol time T. The delay time need not always be the symbol time T. The delay time provided by the delay devices 102 and 104 should merely be an integral multiple of the symbol time T and may be, for example, 2T or 3T.

In the aforesaid first embodiment, the pseudo-error area for quadrature phase PSK is expressed by the expression (2). Assuming that a double differential phase of a received signal is $\Delta^2\theta$ the pseudo-error area for M-ary PSK is given by the following expression (4):

$$|(\Delta^2\theta+\pi/M)\text{mod}\pi/(M/2)-\pi/M|\geq\theta\text{th} \quad 0<\theta\text{th}<\pi/M \qquad (4)$$

As mentioned above, in the first embodiment, a double differential value of the phase of a received signal is used to infer a C/N serving as an index of the quality of a channel. A phase shift caused by fast fading or a phase rotation deriving from a frequency offset of a received signal can therefore be eliminated. A difference in nature of one propagation path from another becomes less influential. Moreover, since channel control is performed on the basis of the inferred C/N, successful channel control unsusceptible to a difference in nature of one propagation path from another can be realized.

Second Embodiment

Figure 8:
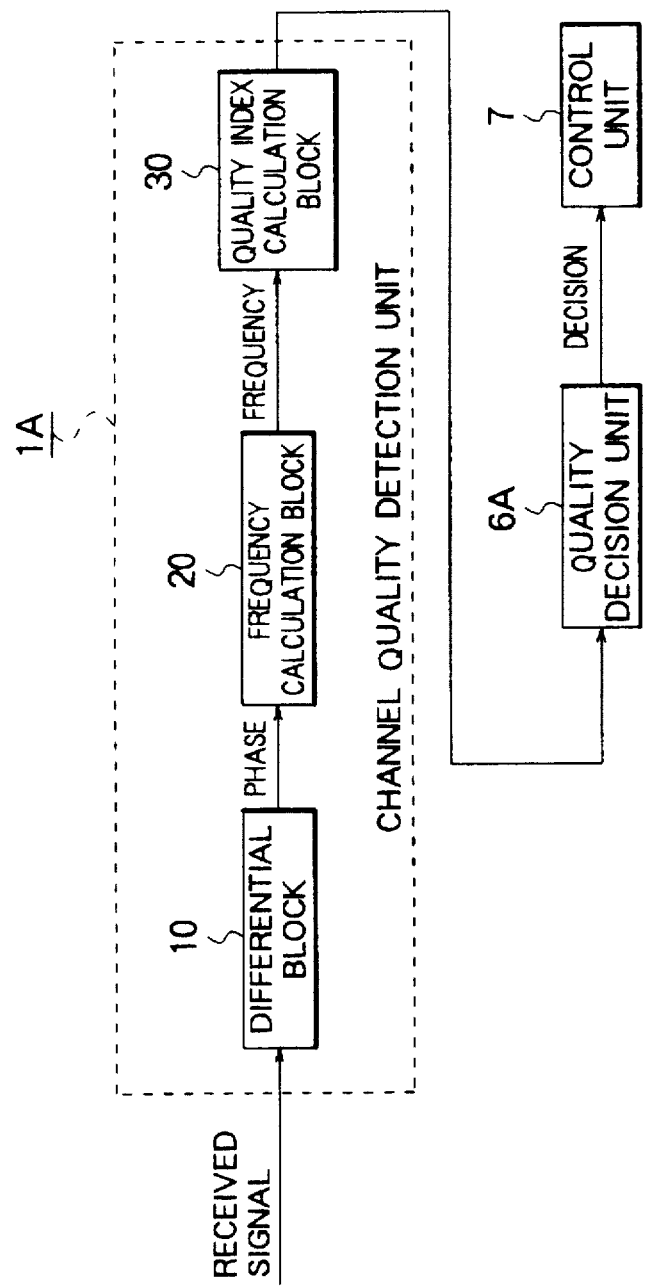
FIG. 8 shows the configuration of a communication control unit in accordance with the second embodiment of the present invention.

The configuration of a communication control unit in accordance with the second embodiment of the present invention will be described with reference to FIG. 8. FIG. 8 is a block diagram showing the configuration of the communication control unit in accordance with the second embodiment of the present invention.

Referring to FIG. 8, the communication control unit in accordance with the second embodiment comprises a channel quality detection unit 1A, a quality decision unit 6A, and a control unit 7.

In the drawing, the channel quality detection unit 1A comprises a differential block 10, a frequency calculation block 20, and a quality index calculation block 30A.

In the first embodiment, the quality index calculation block 30 uses a C/N inferred from a calculated pseudo-error rate as an index of the quality of a channel. In the second embodiment, if an inferred C/N need not be calculated for channel control, conversion to the inferred C/N is not carried out but a pseudo-error rate alone is used for channel control. The other components are identical to those of the first embodiment. The description of the components will be omitted.

As mentioned above, in the second embodiment, if an inferred C/N need not be calculated in the quality index calculation block 30A, a pseudo-error rate alone is used for channel control. A procedure for converting a pseudo-error rate into a C/N can be omitted, and therefore the configuration of the quality index calculation block 30A can be simplified.

Third Embodiment

Figure 9:
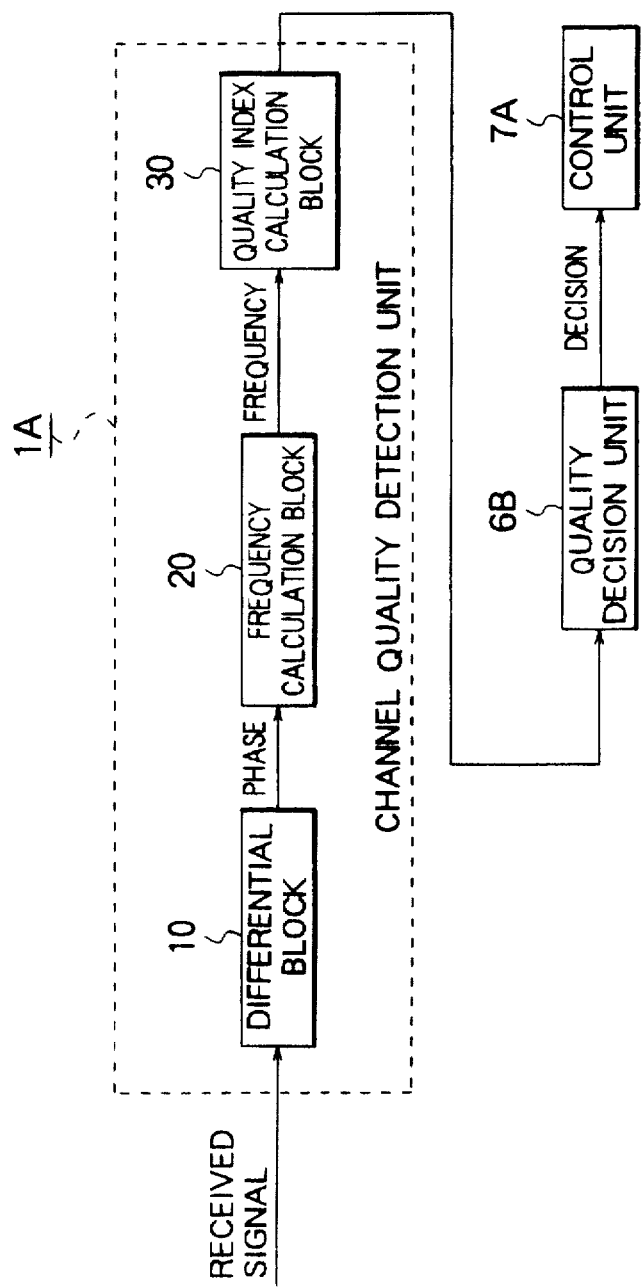
FIG. 9 shows the configuration of a communication control unit in accordance with the third embodiment of the present invention.

The configuration of a communication control unit in accordance with the third embodiment of the present invention will be described with reference to FIG. 9. FIG. 9 is a block diagram showing the configuration of the communication control unit in accordance with the third embodiment of the present invention.

Referring to FIG. 9, the communication control unit in accordance with the third embodiment comprises a channel quality detection unit 1A, a quality decision unit 6B, and a control unit 7A.

In the drawing, the channel quality detection unit 1A comprises a differential block 10, a frequency calculation block 20, and a quality index calculation block 30.

In the first embodiment, if it is found on the basis of an output of a decision output from the quality decision unit 6 that a channel is good, the control unit 7 for controlling channels keeps using the channel as it is. If the channel is not good, the control unit 7 gives control so as to switch the channel to another. In the third embodiment, if none of the other channels is good, the quality decision unit 6B decides that connection is disabled. The result of decision is output to the control unit 7A. The control unit 7A gives control so as to disconnect a channel. The other components are identical to those of the first embodiment. The description of the components will be omitted.

As mentioned above, in the third embodiment, if the states of usable channels are poor, connection to a channel is suspended. Channel control such as switching and disconnection can therefore be achieved efficiently.

Fourth Embodiment

Figure 10:
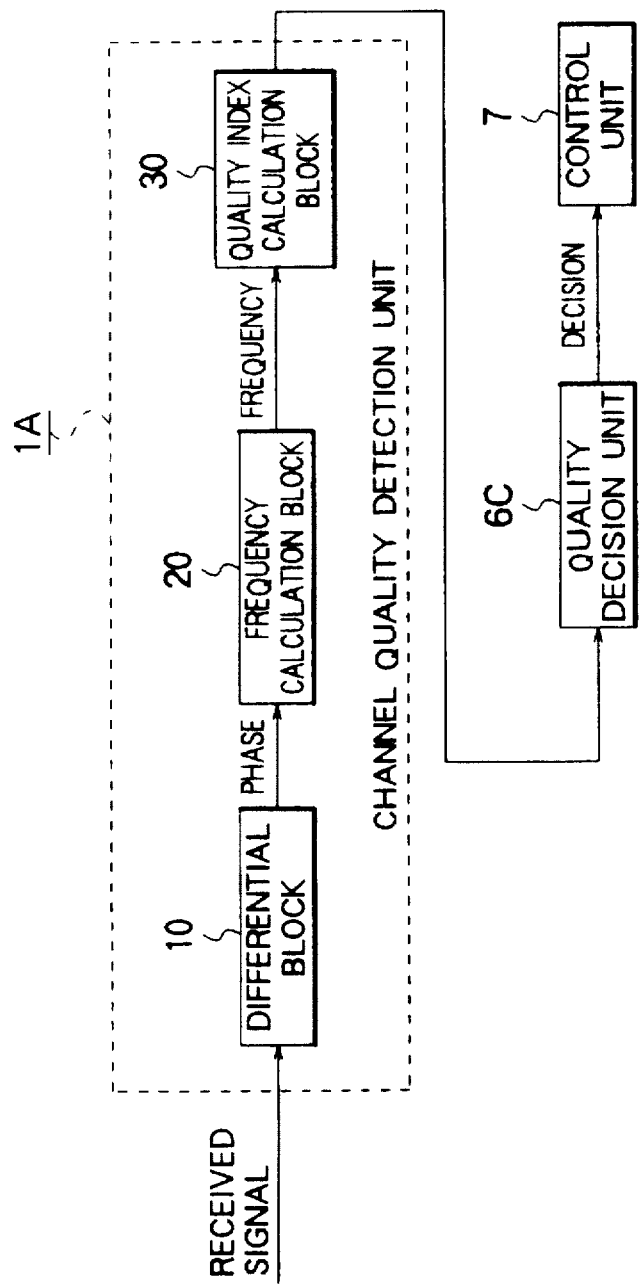
FIG. 10 shows the configuration of a communication control unit in accordance with the fourth embodiment of the present invention.

The configuration of a communication control unit in accordance with the fourth embodiment of the present invention will be described with reference to FIG. 10. FIG. 10 is a block diagram showing the configuration of the communication control unit in accordance with the fourth embodiment of the present invention.

Referring to FIG. 10, the communication control unit in accordance with the fourth embodiment comprises a channel quality detection unit 1A, a quality decision unit 6C, and a control unit 7.

In the drawing, the channel quality detection unit 1A comprises a differential block 10, a frequency calculation block 20, and a quality index calculation block 30.

Figure 11:
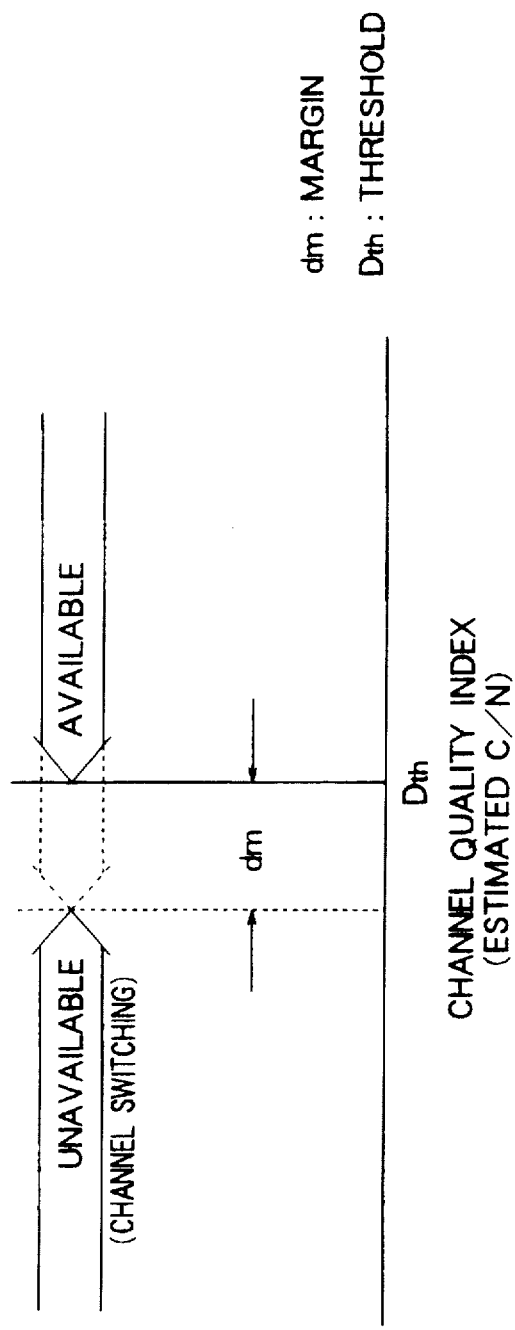
FIG. 11 shows the principles of channel quality decision which are implemented in a quality decision block in the fourth embodiment of the present invention.

FIG. 11 shows the principles of channel quality decision which are implemented in the quality decision unit 6C in the fourth embodiment. In the aforesaid first embodiment, if it is found on the basis of an output of a decision output from the quality decision unit 6 that a channel is good, the control unit 7 for controlling channels keeps using the channel as it is. If the channel is not good, the control unit 7 switches the channel into another channel. In the fourth embodiment, a threshold Dth used to judge whether or not a channel is good by means of the quality decision unit 6C is provided with a certain margin dm. If the result of channel quality index calculation which is provided by the channel quality detection unit 1A lies within the margin dm, although an index of the quality of a channel falling below the threshold Dth is calculated, switching is not carried out. When an index of the quality of a channel falling below the margin and indicating the aggravated quality of a channel is calculated, an output of a decision indicating that communication over the channel is unfeasible is output to the control unit 7. The control unit 7 then gives control so as to switch the channel into another usable channel.

As mentioned above, in the fourth embodiment, when the state of a usable channel is poor, if one result of channel quality detection is different from another because of the property of a receiver, channel control can be performed successfully.

Fifth Embodiment

Figure 12:
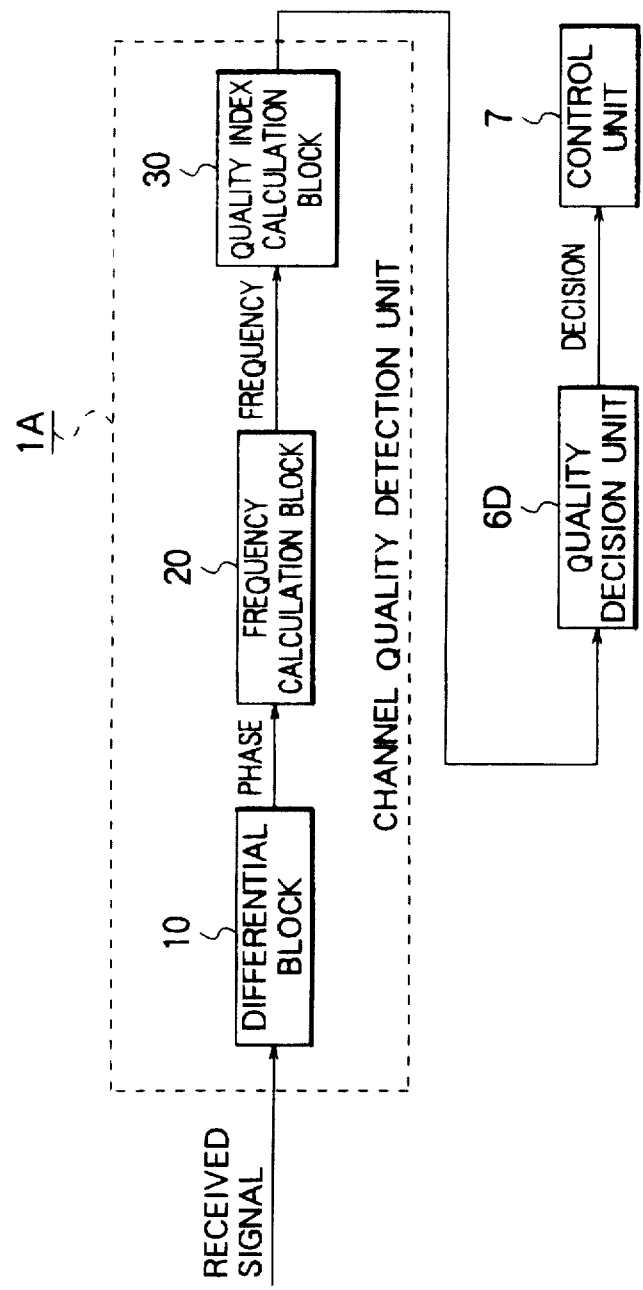
FIG. 12 is a block diagram showing the configuration of a communication control unit in accordance with the fifth embodiment of the present invention.

The configuration of a communication control unit in accordance with the fifth embodiment of the present invention will be described with reference to FIG. 12. FIG. 12 is a block diagram showing the configuration of the communication control unit in accordance with the fifth embodiment of the present invention.

Referring to FIG. 12, the communication control unit in accordance with the fifth embodiment comprises a channel quality detection unit 1A, a quality decision unit 6D, and a control unit 7.

In the drawing, the channel quality detection unit 1A comprises a differential block 10, a frequency calculation block 20, and a quality index calculation block 30.

In the aforesaid first embodiment, if it is found on the basis of an output of a decision output from the quality decision unit 6 that a channel is good, the control unit 7 for controlling channels keeps using the channel as it is. If the channel is not good, the control unit 7 switches the channel to another channel. In the fifth embodiment, if a channel is not good, the quality decision unit 6D decides from the results of channel quality detection which are provided by the channel quality detection unit 1A which channel has the best quality among all usable channels. Based on an output of a decision, the control unit 7 gives control so as to enable connection to the best channel. The other components are identical to those of the first embodiment. The description of the components will be omitted.

As mentioned above, in the fifth embodiment, a channel can be switched to a channel having the best quality among all usable channels. This leads to successful channel control.

Sixth Embodiment

Figure 13:
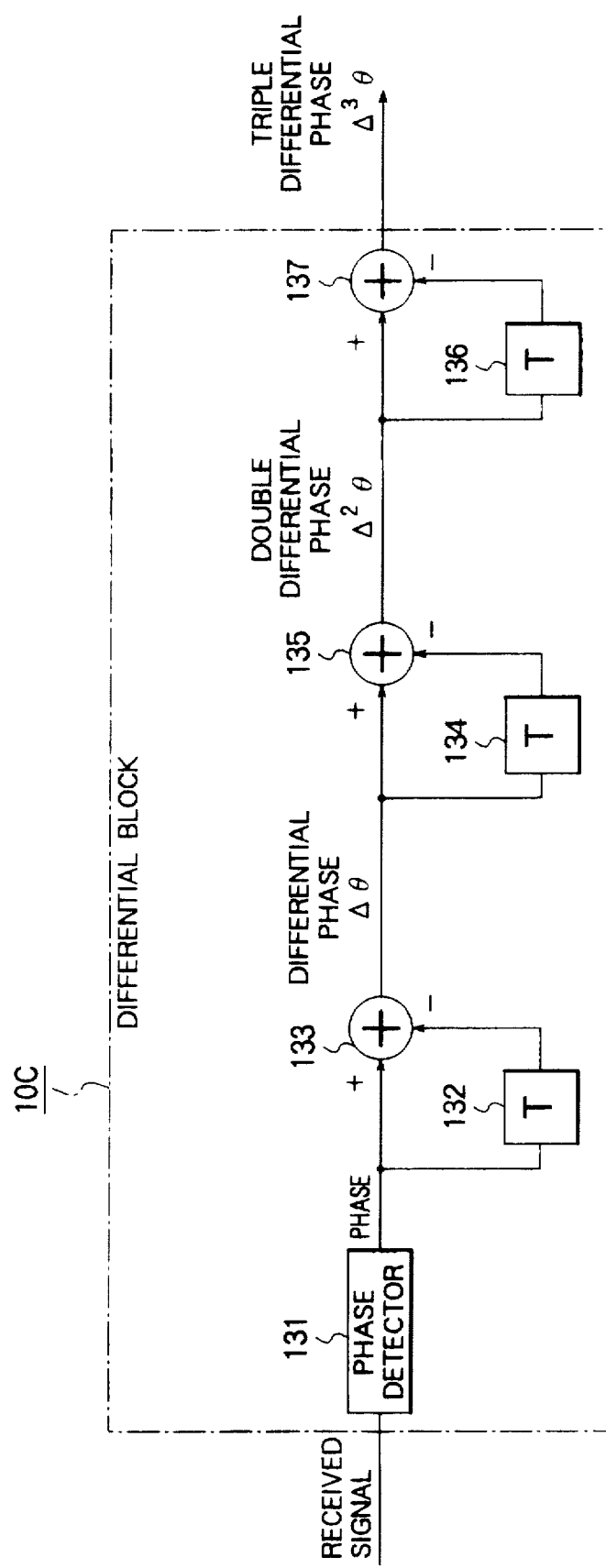
FIG. 13 shows the configuration of a differential block in the sixth embodiment of the present invention.

In the aforesaid first embodiment, the differential block 10 for subtracting the phase of a received signal is used as a differential means to perform differential twice on the phase o a received signal. In the sixth embodiment, a triple-differential phase of a received signal is calculated instead as shown in FIG. 13. Based on the result of calculation, the quality of a channel is detected, and then channel control is carried out.

Referring to FIG. 13, a differential block 10C includes a phase detector 131 for extracting phase information of a received signal, delay devices 132, 134, and 136 for delaying an input signal by one symbol time, and subtractors 133, 135, and 137 for calculating a difference value. The components other than the differential block 10C are identical to those of the first embodiment. The description of the components will be omitted.

Next, the operation of the differential block 10C in the sixth embodiment will be described. Similarly to the differential block 10 in the first embodiment, a differential value of the phase of an input received signal is calculated by the subtractor 133 at intervals of a symbol time T. The subtractor 135 calculates a double differential phase that is a difference between a differential phase of an input signal and a differential phase of a signal lagging behind the input signal by one symbol time. The subtractor 137 calculates a triple differential phase that is a difference between a double differential phase of an input signal and a double differential phase of a signal lagging behind the input signal by one symbol time.

As mentioned above, in the sixth embodiment, a triple differential phase of a received signal calculated by the differential block 10C is used to detect the quality of a channel. Compared with the case of using a double differential, this embodiment can exert an effect equivalent to that of reducing the signal-to-noise ratio of a received signal. Even when a C/N is large, a frequency of falling into a pseudo-error area which is calculated by the frequency calculation block 20 can be increased. Moreover, it is possible to suppress the deterioration in accuracy of channel quality detection deriving from a phase shift caused by fading, which poses a problem under a large C/N and which cannot be removed by the use of a double differential of the phase of a received signal. Consequently, a satisfactory result of channel quality detection can be obtained, and channel control can be performed successfully even under a large C/N.

Seventh Embodiment

Figure 14:
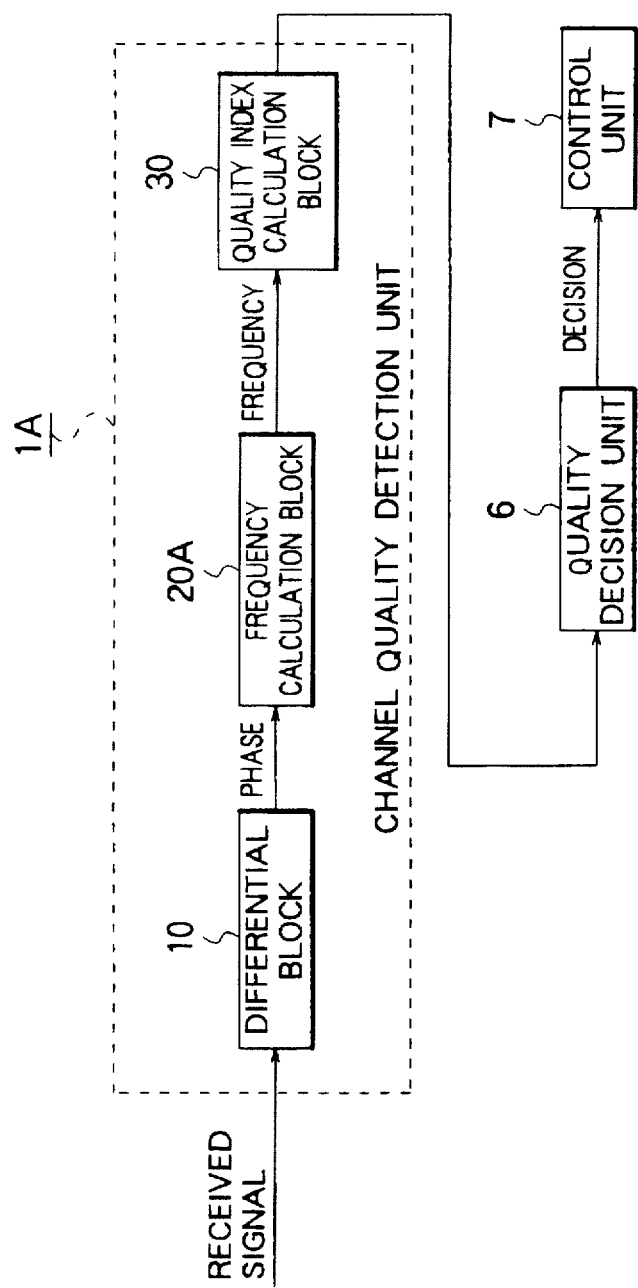
FIG. 14 shows the configuration of a communication control unit in accordance with the seventh embodiment of the present invention.

The configuration of a communication control unit in accordance with the seventh embodiment of the present invention will be described with reference to FIG. 14. FIG. 14 is a block diagram showing the configuration of the communication control unit in accordance with the seventh embodiment of the present invention.

Referring to FIG. 14, the communication control unit in accordance with the seventh embodiment comprises a channel quality detection unit 1A, a quality decision unit 6, and a control unit 7.

In the drawing, the channel quality detection unit 1A comprises a differential block 10, a frequency calculation block 20A, and a quality index calculation block 30.

In the aforesaid first embodiment, the pseudo-error area set in the pseudo-error detector 201 in the frequency calculation block 20 is fixed. In the seventh embodiment, the pseudo-error area set in a pseudo-error detector 201A in the frequency calculation block 20A is varied for better calculation of a frequency.

Figure 15:
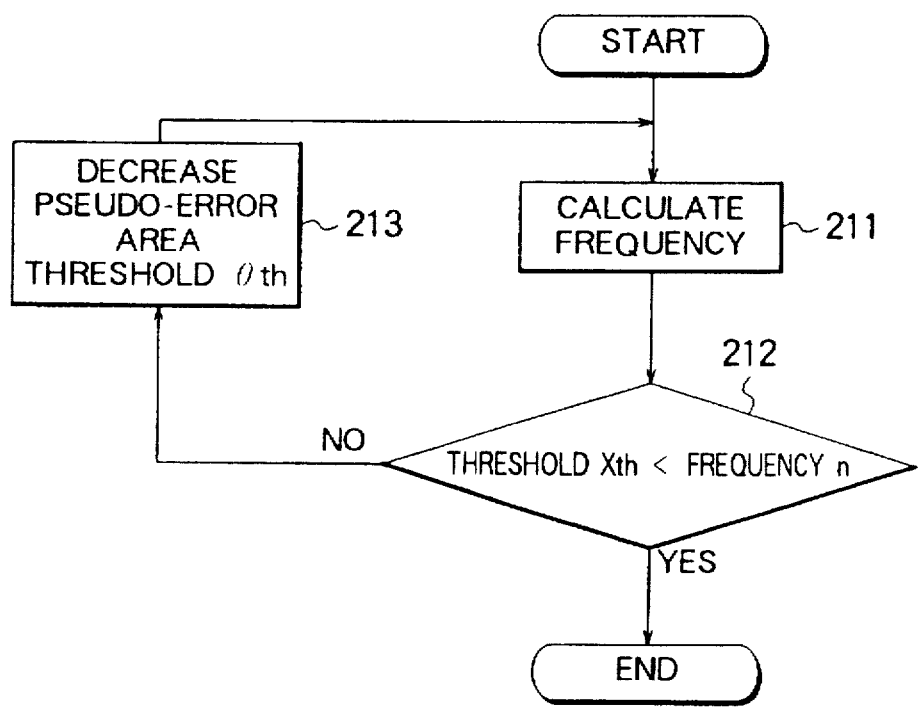
FIG. 15 is a flowchart describing the operation of a pseudo-error area varying means in a frequency calculation block in the seventh embodiment of the present invention.
Figure 16:
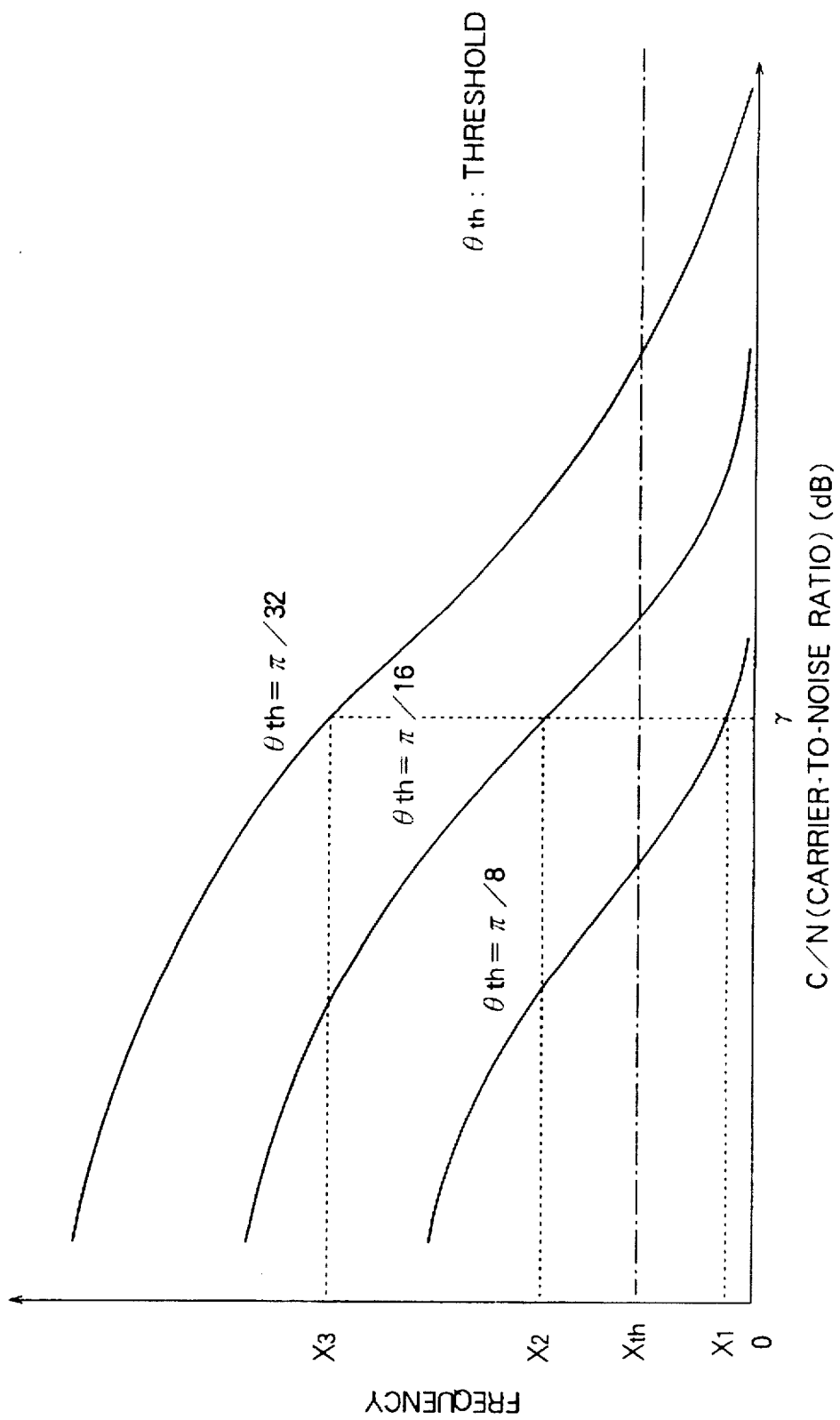
FIG. 16 is an explanatory diagram on the principles implemented in the pseudo-error varying means in the seventh embodiment of the present invention.

FIG. 15 is a flowchart describing the operation of a pseudo-error area varying means in the frequency calculation block 20A in the seventh embodiment. FIG. 16 shows the principles implemented in the pseudo-error area varying means. The other components are identical to those of the first embodiment. The description of the components will be omitted.

Next, a difference of the seventh embodiment from the first embodiment will be described in conjunction with FIGS. 15 and 16. A double differential phase that is an output of the differential block 10 obtained through the same processing as that in the first embodiment is used to set a threshold $\theta$ th included in the expression (2) defining a pseudo-error area to $\pi/8$ serving as an initial value. Assuming that the C/N of a received signal is indicated with a dashed line in FIG. 16, if an obtained frequency X1 is smaller than a pre-defined threshold Xth of a frequency, the threshold $\theta$ th is changed to a smaller value of $\pi/16$ so that a larger frequency can be worked out. The pseudo-error detector 201A then detects a pseudo error by performing the same processing as that in the first embodiment (steps 211 to 213). The number of pseudo errors is counted within an observation time by means of a counter 202, whereby a frequency is worked out.

When a condition that the result of frequency calculation is larger than or equal to the threshold Xth of a frequency is met, frequency calculation is terminated. When the result is smaller than the threshold Xth of a frequency, the threshold $\theta$ th is changed to a smaller value of $\pi/32$. Frequency calculation is then continued. The foregoing sequence is described in the flowchart of FIG. 15.

As mentioned above, in the seventh embodiment, the pseudo-error area set in the pseudo-error detector 201A in the frequency calculation block 20A is varied depending on the state of a channel. An index of the quality of a channel is then detected. Even if the C/N of a received signal is relatively large, therefore, a frequency does not decrease. A drop in accuracy of channel quality index detection therefore hardly takes place. Consequently, a wide range of states of channels can be covered and the qualities of the channels can be detected.

Eighth Embodiment

Figure 17:
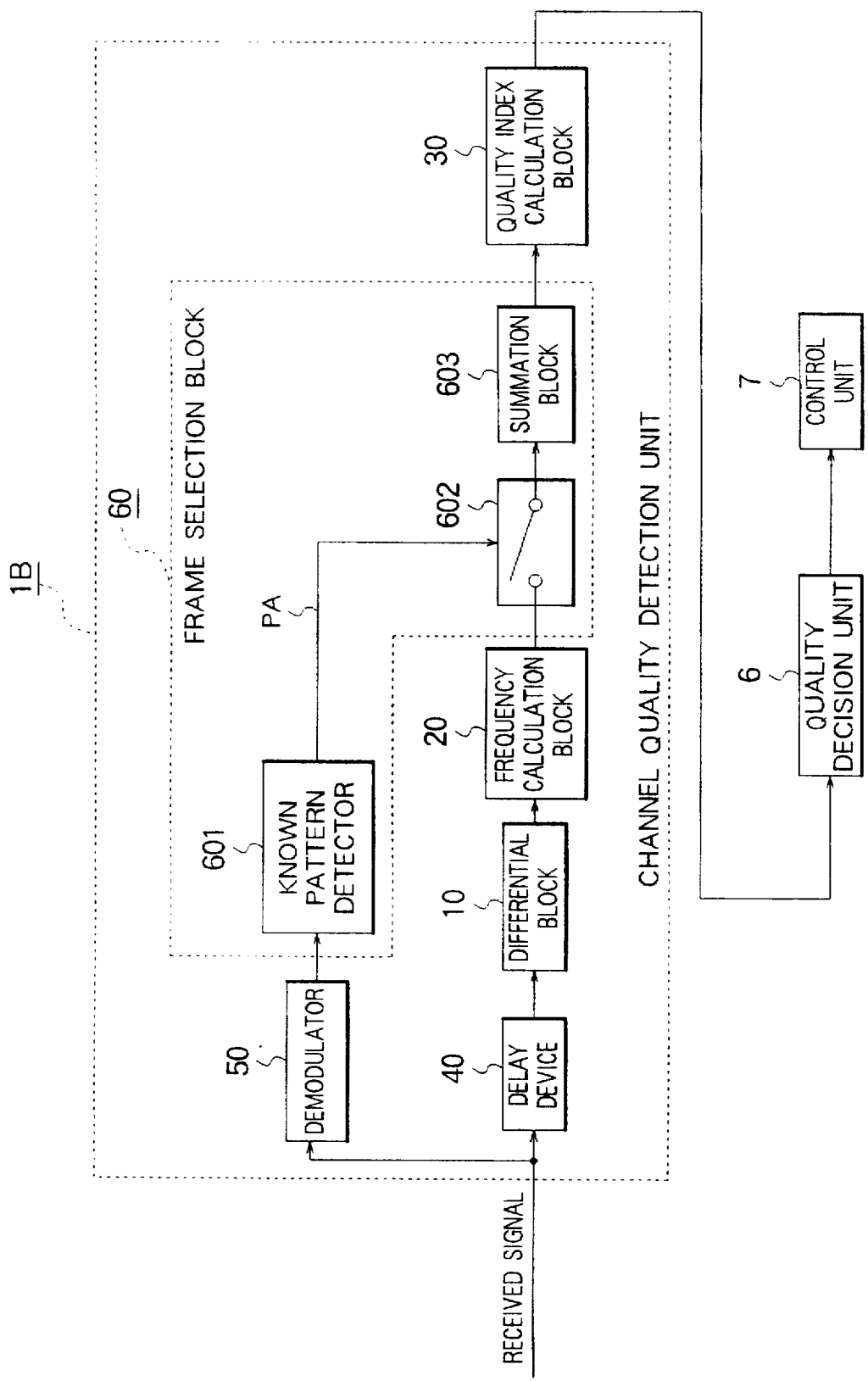
FIG. 17 is a block diagram showing the configuration of a communication control unit in accordance with the eighth embodiment of the present invention.

The configuration of a communication control unit in accordance with the eighth embodiment of the present invention will be described with reference to FIG. 17. FIG. 17 is a block diagram showing the configuration of the communication control unit in accordance with the eighth embodiment of the present invention.

Referring to FIG. 17, the communication control unit in accordance with the eighth embodiment comprises a channel quality detection unit 1B, a quality decision unit 6 and a control unit 7.

In the drawing, the channel quality detection unit 1B comprises a differential block 10, a frequency calculation block 20, a quality index calculation block 30, a delay device 40, a demodulator 50, and a frame selection block 60.

In the drawing, the frame selection block 60 includes a known pattern detector 601, a switch 602, and a summation blook 603.

In the aforesaid first embodiment, the channel quality detection unit 1A calculates a frequency observed within a certain observation time. In the eighth embodiment, the channel quality detection unit 1B includes the frame selection block 60 so that the channel quality detection unit 1B can detect the quality of a channel using only frames to which a known pattern sent from a transmission side has been appended and in which the known pattern can be detected by the known pattern detector 601 on a reception side. The other components are identical to those of the first embodiment. The description of the components will be omitted.

Figure 18:
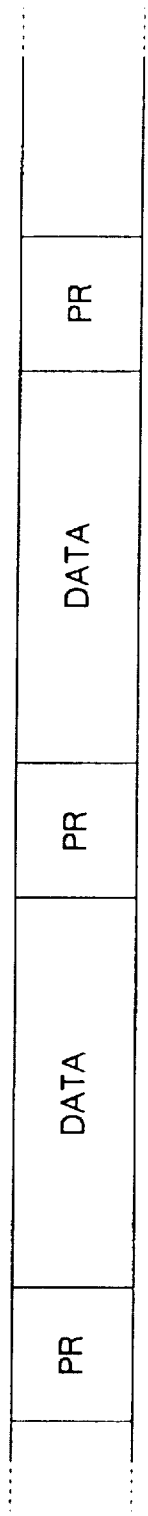
FIG. 18 shows the structure of a frame, to which a known pattern sent from a transmission side is appended, in the eighth embodiment of the present invention.

Next, a difference from the first embodiment will be described in conjunction with FIGS. 17 and 18. FIG. 18 shows an example of the structure of a frame to which a known pattern sent from a transmission side is appended. In FIG. 18, "PR" at the start of the frame denotes a preamble division containing a known pattern of unique words (UW) or the like. The succeeding division contains information data (DATA) to be transmitted.

FIG. 17 shows the configuration of the channel quality detection unit 1B of the communication control unit having the frame selection block 60. The demodulator 50 demodulates data from a received signal. The known pattern detector 601 detects unique words constituting a known pattern contained in a preamble division of a frame. The delay device 40 delays a received signal to be input to the differential block 10 by a time comparable to a delay in processing caused by the demodulator 50 and known pattern detector 601. The frequency calculation block 20 calculates a frequency within a frame in units of a frame on the basis of a differential phase that is an output of the differential block 10.

When the known pattern detector 601 detects a known pattern, the switch 602 is made with a detection pulse PA. An output of the frequency calculation block 20 is then output to the summation block 603. When the known pattern cannot be detected, the switch 602 is broken with the detection pulse PA. Only a calculated frequency within a frame in which the known pattern is detected is sent to the summation block 603.

When a time coincident with frames in which the known pattern is detected becomes equal to a predetermined observation time, the summation block 603 terminates an operation of summation. A total frequency provided by the summation block 603 is then output to the quality index calculation block 30. The operation of the quality index calculation block 30 is identical to that in the first embodiment. As mentioned above, the channel quality detection unit 1B in the eighth embodiment terminates channel quality detection when frames in which the known pattern is detected and which coincide with the observation time have been input.

As mentioned above, in the eighth embodiment, the frame selection block 60 uses only the frames in which the known pattern is detected to detect the quality of a channel. Even if a radio wave is cut off due to blockage or shadowing, the quality of a channel unaffected by the cutoff can be detected accurately.

Ninth Embodiment

Figure 19:
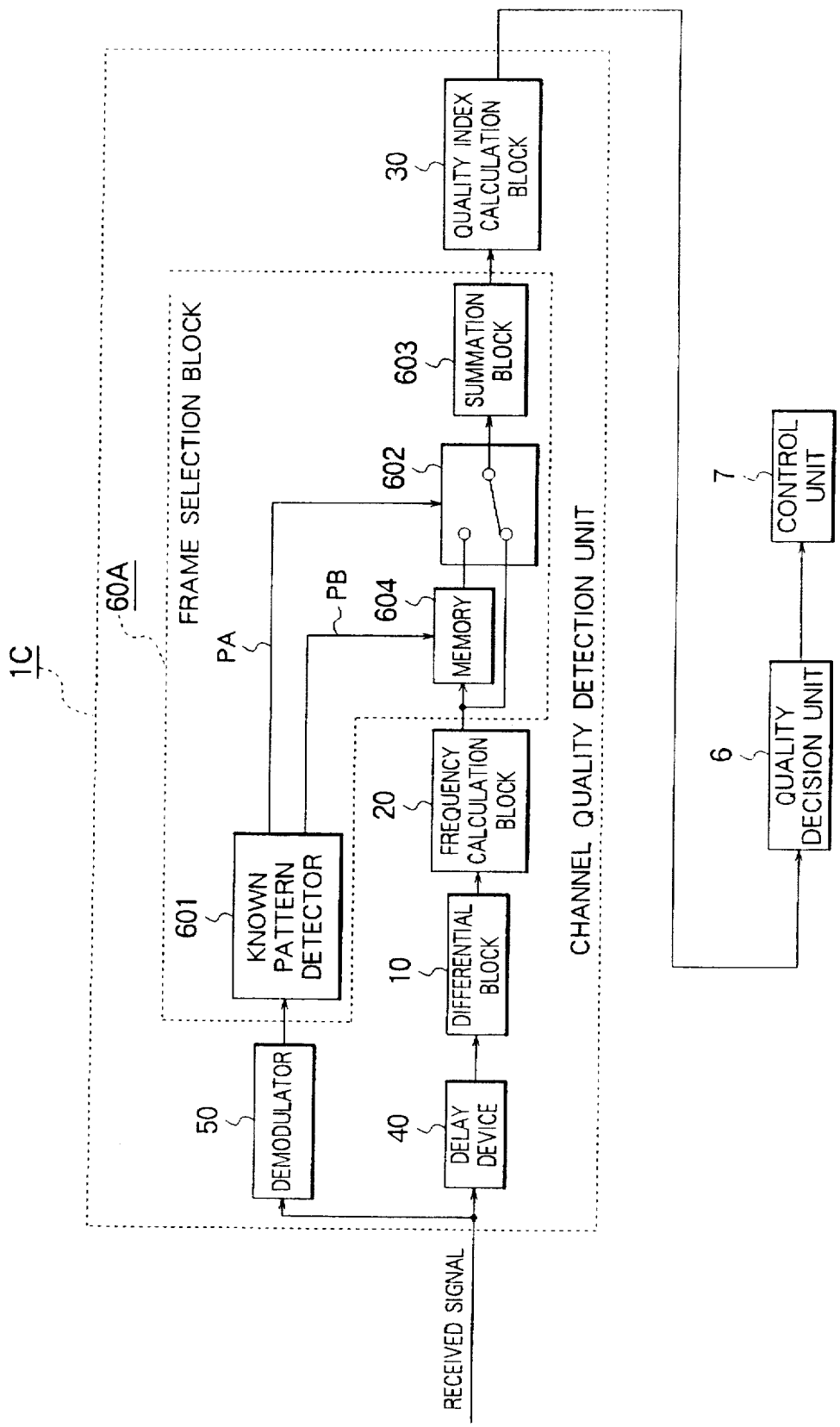
FIG. 19 is a block diagram showing the configuration of a communication control unit in accordance with the ninth embodiment of the present invention.
Figure 20:
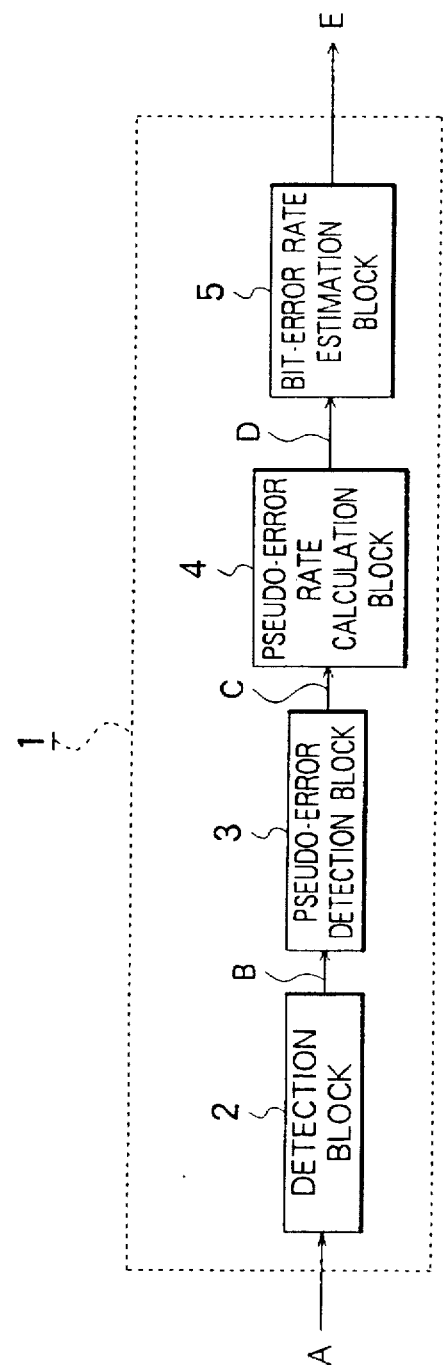
FIG. 20 shows the configuration of a channel quality detection unit adapted for a conventional communication control unit.
Figure 21:
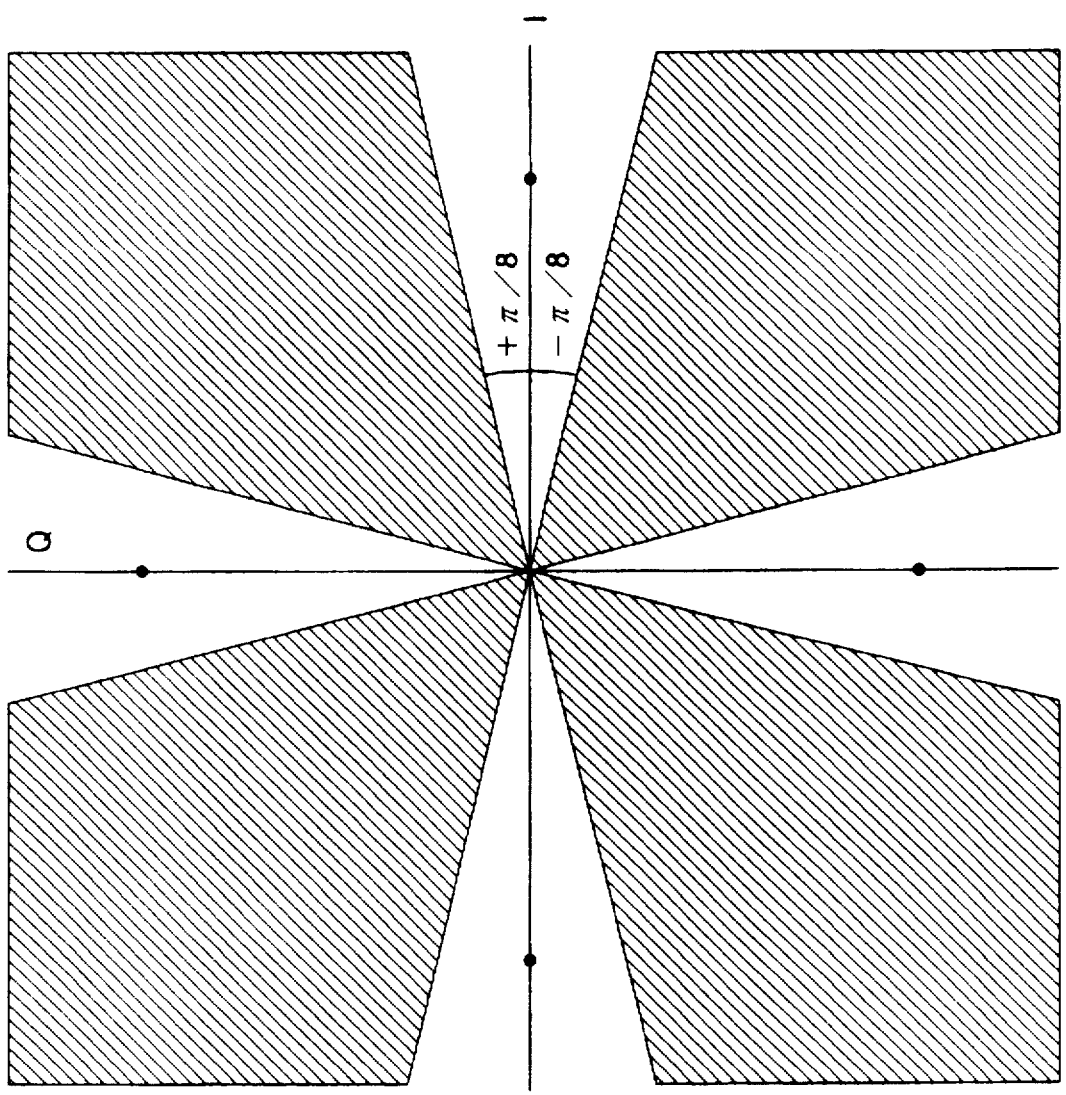
FIG. 21 shows a pseudo-error area for explaining the principles of pseudo-error detection in the conventional channel quality detection unit.

The configuration of a communication control unit in accordance with the ninth embodiment of the present invention will be described with reference to FIG. 19. FIG. 19 is a block diagram showing the configuration of the communication control unit in accordance with the ninth embodiment of the present invention.

Referring to FIG. 19, the communication control unit in accordance with the ninth embodiment comprises a channel quality detection unit 1C, a quality decision unit 6, and control unit 7.

In the drawing, the channel quality detection unit iC comprises a differential block 10, a frequency calculation block 20, a quality index calculation block 30, a delay device 40, a demodulator 50, and a frame selection block 60A.

In the drawing, the frame selection block 60A includes a known pattern detector 601, a switch 602, a summation block 603, and a memory 604.

In the aforesaid eighth embodiment, the channel quality detection unit 1B includes the frame selection block 60 so that the channel quality detection unit 1B can detect the quality of a channel using only the frames in which the known pattern can be detected by the known pattern detector 601 on a reception side. The channel quality detection unit 1B uses only the frames selected by the frame selection block 60 and terminates channel quality detection when frames which coincide with an observation time have been input. In the ninth embodiment, a calculated frequency within one of all frames currently being received in which a known pattern is detected by the known pattern detector 601 is stored in the memory 604. If the known pattern cannot be detected in a frame received next, the frequency is read from the memory 604 and substituted as a frequency observed within the frame in which the known pattern cannot be detected. Thus, a frequency within an observation time is calculated. FIG. 19 shows the configuration of a channel quality detection unit 1C different from that in the eighth embodiment. The other components are identical to those of the eighth embodiment. The description of the components will be omitted.

Next, the operation different from the one in the eighth embodiment will be described in conjunction with FIG. 19. Referring to FIG. 19, the configuration of the channel quality detection unit 1C in the ninth embodiment is such that the frequency calculation block 20 calculates a frequency within a frame by performing the same processing as that in the eighth embodiment. When the known pattern detector 601 detects a known pattern by performing the same processing as that in the eighth embodiment, a write pulse PB used to store a calculated frequency within a frame in which the known pattern is detected in the memory 604 is output. The frequency is then stored in the memory 604. When the known pattern detector 601 detects the known pattern, the switch 603 outputs a frequency within a frame which is provided by the frequency calculation block 20 to the summation block 603.

However, when the known pattern is not detected, the switch 602 is switched over to the memory 604 with a detection pulse PA output from the known pattern detector 601. A calculated frequency within a frame in which the known pattern has been detected previously is output to the summation block 603. If the known pattern is not detected even in the next frame, the frequency in the memory 604 is output again to the summation block 603. Thus, frequencies are summed, whereby a frequency within an observation time is calculated. The other operations are identical to those in the eighth embodiment. The description of the operations will be omitted.

As mentioned above, in the ninth embodiment, when the frame selection block 60A detects the known pattern in a frame, a calculated frequency within the frame is used. When the known pattern is not detected, a frequency within a frame in which the known pattern has been detected previously is substituted in order to detect the quality of a channel. Even if a radio wave is cut off due to blockage or shadowing, the quality of a channel unaffected by the cutoff can be detected accurately. Moreover, the quality of a channel can be detected without any increase in time required for detecting the quality of a channel.

What is claimed is:

1. A communication control unit, comprising:
   a channel quality detection unit for calculating an index of the quality of a channel employed using a received signal, wherein said channel quality detection unit includes: a differential unit for calculating a multi-differential phase by performing a plurality of times subtraction on a first received signal and a second received signal laaging behind said first received signal by a predetermined time, a frequency calculation block for calculating a frequency by which said multi-differential phase falls into a pseudo-error area within a predetermined observation time, and a quality index calculation block for calculating an index of the quality of a channel on the basis of an output of said frequency calculation block;

a quality decision unit for deciding from the result of channel quality index calculation performed on the channel employed which is provided by said channel quality detection unit whether or not a channel is good; and a control unit for controlling the channel according to the result of channel quality decision performed by said quality decision unit.

2. The communication control unit according to claim 1, wherein said differential block performs differential twice or more times.

3. The communication control unit according to claim 1, wherein said frequency calculation block includes:

a pseudo-error detection block for deciding whether or not a multi differential phase output from said differential block falls into said pseudo-error area and for outputting the result of decision; and a count block for counting the number of pseudo errors detected within a predetermined observation time according to the result of pseudo-error detection which is output from said pseudo-error detection block.

4. The communication control unit according to claim 3, wherein said pseudo-error detection means varies the size of said pseudo-error area according to the quality of a channel.

5. The communication control unit according to claim 1, wherein said quality index calculation block calculates a pseudo-error rate observed within an observation time as an index of the quality of a channel on the basis of an output of said frequency calculation block.

6. The communication control unit according to claim 5, wherein said quality index calculation block converts said pseudo-error rate into a carrier-to-noise ratio (C/N) and calculates the C/N as an index of the quality of a channel.

7. The communication control unit according to claim 1, wherein said channel quality detection unit further includes a frame selection unit for detecting the quality of a channel using only the frames to which a known pattern sent from a transmission side has been appended and in which said known pattern is detected.

8. The communication control unit according to claim 1, wherein said channel quality detection unit further includes a frame selection unit that when a known pattern sent from a transmission side and appended to a frame is detected, uses a calculated frequency within the frame; that when said known pattern is not detected, substitutes a calculated frequency within a frame in which said known pattern has been detected previously, and that thus calculates a frequency within a predetermined observation time.

9. The communication control unit according to claim 1, wherein when the result of channel quality index calculation performed on a channel employed which is provided by said channel quality detection unit falls below a predetermined threshold indicating a lower limit of the quality of a channel, said quality decision unit decides that communication is unfeasible.

10. The communication control unit according to claim 9, wherein said quality decision unit has a margin predetermined relative to said threshold; when the result of channel quality index calculation performed on a channel employed which is provided by said channel quality detection unit lies within said margin, said quality decision unit decides that communication is feasible; and when said result of channel quality index calculation falls below said margin and indicates the aggravated quality of a channel, said quality decision unit decides that communication is unfeasible.

11. The communication control unit according to claim 9, wherein when it is decided from the result of channel quality decision, which is provided by said quality decision unit, that communication is unfeasible, said control unit switches a channel concerned to another channel.

12. The communication control unit according to claim 9, wherein when it is decided from the result of channel quality decision, which is provided by said quality decision unit, that communication is unfeasible, said control unit disconnects a channel concerned.

13. The communication control unit according to claim 9, wherein when it is decided that communication is unfeasible, said quality decision unit decides from the results of channel quality index calculation which is provided by said channel quality detection unit which channel is the best of all usable channels, and said control unit switches an ongoing channel into a channel decided as the best channel.

* * * * *